United States Patent
Johri et al.

(10) Patent No.: US 9,415,773 B2
(45) Date of Patent: Aug. 16, 2016

(54) PREDICTIVE ENGINE PULL UP AND PULL DOWN IN HYBRID VEHICLE

(71) Applicant: FORD GLOBAL TECHNOLOGIES, LLC, Dearborn, MI (US)

(72) Inventors: Rajit Johri, Ann Arbor, MI (US); Mark Steven Yamazaki, Canton, MI (US); Xiaoyong Wang, Novi, MI (US); Wei Liang, Farmington Hills, MI (US); Bernard D. Nefcy, Novi, MI (US); Derek Taylor, Waterford, MI (US); Robert Wright, Royal Oak, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 14/154,213

(22) Filed: Jan. 14, 2014

(65) Prior Publication Data
US 2015/0197243 A1    Jul. 16, 2015

(51) Int. Cl.
*B60L 9/00* (2006.01)
*B60W 20/00* (2016.01)
*B60W 10/06* (2006.01)
*B60W 10/10* (2012.01)
*B60W 10/08* (2006.01)

(52) U.S. Cl.
CPC ............... *B60W 20/40* (2013.01); *B60W 10/06* (2013.01); *B60W 10/08* (2013.01); *B60W 10/10* (2013.01); *B60W 20/10* (2013.01); *B60W 20/12* (2016.01); *B60W 2540/10* (2013.01); *B60W 2550/143* (2013.01); *Y02T 10/6286* (2013.01); *Y10S 903/93* (2013.01)

(58) Field of Classification Search
CPC ... B60W 10/06; B60W 10/08; B60W 20/102; B60W 20/104
See application file for complete search history.

(56) References Cited

U.S. PATENT DOCUMENTS

| | | | |
|---|---|---|---|
| 6,842,673 B2 | 1/2005 | Zhang et al. | |
| 6,982,632 B2 | 1/2006 | Nagasaka et al. | |
| 2008/0129473 A1 | 6/2008 | Tsuruta et al. | |
| 2013/0035839 A1* | 2/2013 | Otanez et al. | 701/102 |
| 2013/0041535 A1 | 2/2013 | Choi et al. | |

* cited by examiner

*Primary Examiner* — Michael D Lang
(74) *Attorney, Agent, or Firm* — David Kelley; Brooks Kushman P.C.

(57) ABSTRACT

A system and method for controlling a hybrid vehicle having an engine configured to automatically stop in response to an engine stop request and automatically start in response to an engine start request include selectively inhibiting an engine stop request based on an anticipated duration of an expected decreased driver power command state to reduce occurrence of successive automatic stops and automatic starts.

16 Claims, 6 Drawing Sheets

PREDICTIVE ENGINE PULL UP AND PULL DOWN IN HYBRID VEHICLE

TECHNICAL FIELD

The disclosure relates to hybrid vehicles with engine stop and start logic and modifying the stop and start logic in response to anticipated driver power request variations.

BACKGROUND

Hybrid electric vehicles include engines that may be stopped and started while the vehicle is in motion. When the engine is stopped while the vehicle is in motion, the hybrid vehicle may operate in an "electric only" mode. A controller may issue stop (or "pull down") or start (or "pull up") commands to the engine in response to changes in driver power request.

SUMMARY

A system and method for controlling a hybrid vehicle having an engine configured to automatically stop in response to an engine stop request and automatically start in response to an engine start request according to the present disclosure include selectively inhibiting an engine stop request based on an anticipated duration of an expected decreased driver power command state to reduce occurrence of successive automatic stops and automatic starts.

In one embodiment, the anticipated duration of the expected decreased driver power command state is based on whether the vehicle is approaching a depression in a vehicle path. In another embodiment, the anticipated duration of the expected decreased driver power command state is based on whether the vehicle is approaching a highway entry or exit ramp. In yet another embodiment, the anticipated duration of the expected decreased driver power command state is based on whether the vehicle is approaching an intersection. In another embodiment, the anticipated duration of the expected decreased driver power command state is based on whether the vehicle is turning. In yet another embodiment, the anticipated duration of the decreased driver power command state is anticipated in response to a signal from at least one sensor, including a navigation system, an optical camera, a radar or sonar system, a wireless data communication system, or a steering input sensor. In a further embodiment, the method additionally comprises delaying a vehicle transmission downshift or upshift in response to the anticipated duration of the decreased driver power command state.

A method for controlling a vehicle having an engine with auto stop and auto start functions includes inhibiting the engine auto start function in response to an anticipated increase and subsequent decrease in driver power command.

In one embodiment, the anticipated increase and subsequent decrease in driver request is based on whether the vehicle is approaching a hill. In another embodiment, the anticipated increase and subsequent decrease in driver request is based on whether the vehicle is located in a passing lane and approaching a second vehicle. In yet another embodiment, the anticipated increase and subsequent decrease in driver power command is based on a signal from at least one sensor, including a navigation system, an optical camera, a radar or sonar system, a wireless data communication system, or a steering input sensor.

A hybrid electric vehicle according to the present disclosure includes a controller and an engine configured to stop in response to an engine pull down request and start in response to an engine pull up request. The controller is configured to inhibit a pull down request that was issued based on a decrease in driver power request, where the inhibition is in response to an anticipated subsequent increase in driver power command. The controller is further configured to inhibit a pull up request that was issued based on an increase in driver power request, where the inhibition is in response to an anticipated subsequent decrease in driver power command.

In one embodiment, the controller is configured to inhibit the pull down request in response to a detected vehicle approach to a depression in a vehicle path. In yet another embodiment, the controller is configured to inhibit the pull down request in response to a detected vehicle approach to a highway entry or exit ramp. In another embodiment, the controller is configured to inhibit the pull down request in response to a detected vehicle approach to an intersection. In yet another embodiment, the controller is configured to inhibit the pull down request in response to an anticipated vehicle turn. In a further embodiment, the controller is further configured to delay a vehicle transmission downshift or upshift in response to the anticipated decrease and subsequent increase in driver power command. In another embodiment, the controller is configured to inhibit the pull up request in response to a detected vehicle approach to a hill. In yet another embodiment, the controller is configured to inhibit the pull up request in response to a detected vehicle location in a passing lane and in response to an approach to a second vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
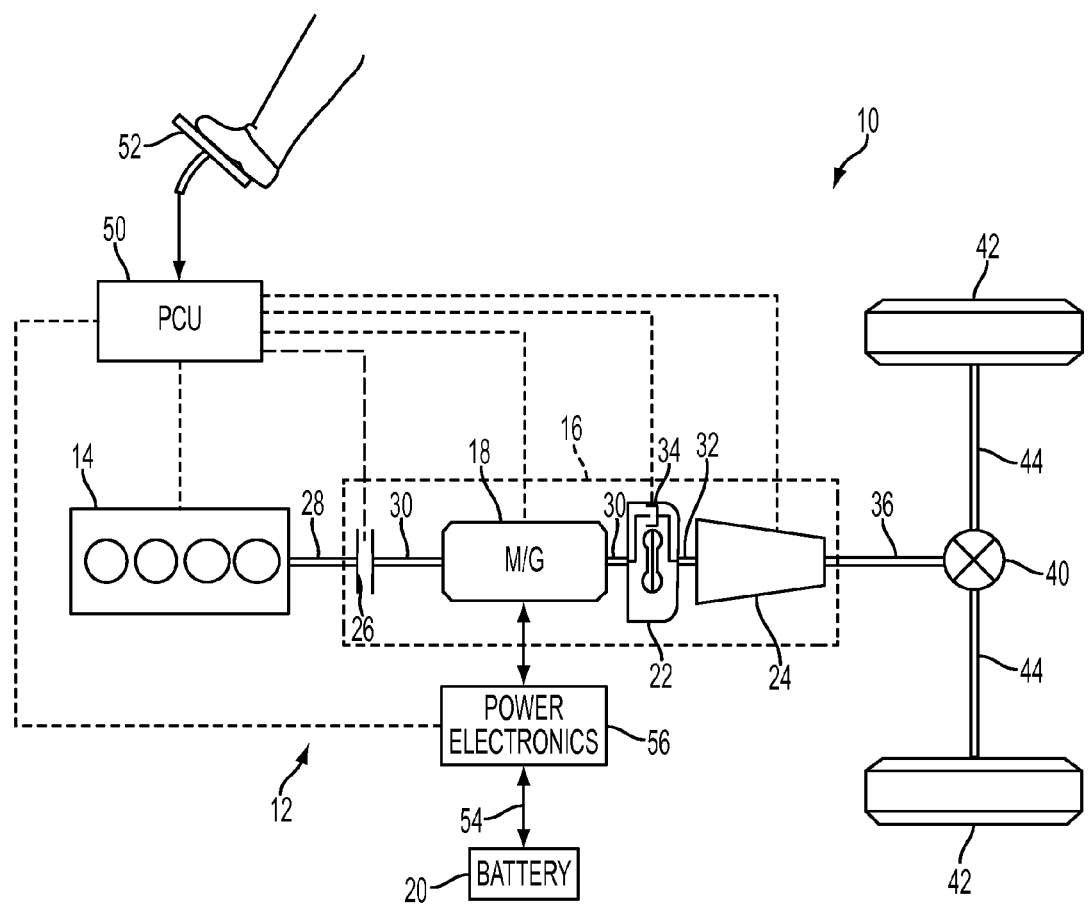
FIG. 1 is a schematic illustration of a hybrid electric vehicle having a modular powertrain configuration.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. Engine 14 may be disabled or turned OFF in response to an engine stop request from a controller. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

A controller, which may be the VSC or other controller as appropriate, may issue commands to the PCU 50 to change between various operating modes. The commands may include engine start and engine stop requests, also known as engine pull up/down (EPUD) requests. EPUD requests may be made in response to various inputs, including position variation of the accelerator pedal 52 and total driver power demand. For example, if the engine 14 is OFF and the accelerator pedal 52 is depressed, the controller may issue an engine pull up request. In response to the engine pull up request, the engine will be started.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

During certain vehicle maneuvers, the base EPUD logic may result in unsatisfactory vehicle behavior. For example, when the vehicle is going in and out of a corner, merging onto a highway entry or exit ramp, or encountering a small temporary change in road grade due to overpass, the base EPUD logic may result in unnecessary short EPUD requests. Such EPUD requests result in a brief engine power on or engine power off event, which may result in lower fuel economy and driver dissatisfaction. For example, in a scenario in which the engine is on and the vehicle enters a sharp corner, the driver will release the accelerator pedal while entering corner. In response to the accelerator pedal release, the base EPUD logic may issue an engine pull down request. However, when the vehicle exits the curve, the driver may again depress the accelerator, causing the base EPUD logic to issue an engine pull up request. This unnecessary engine shutdown and restart may reduce fuel economy and driver satisfaction.

Figure 2:
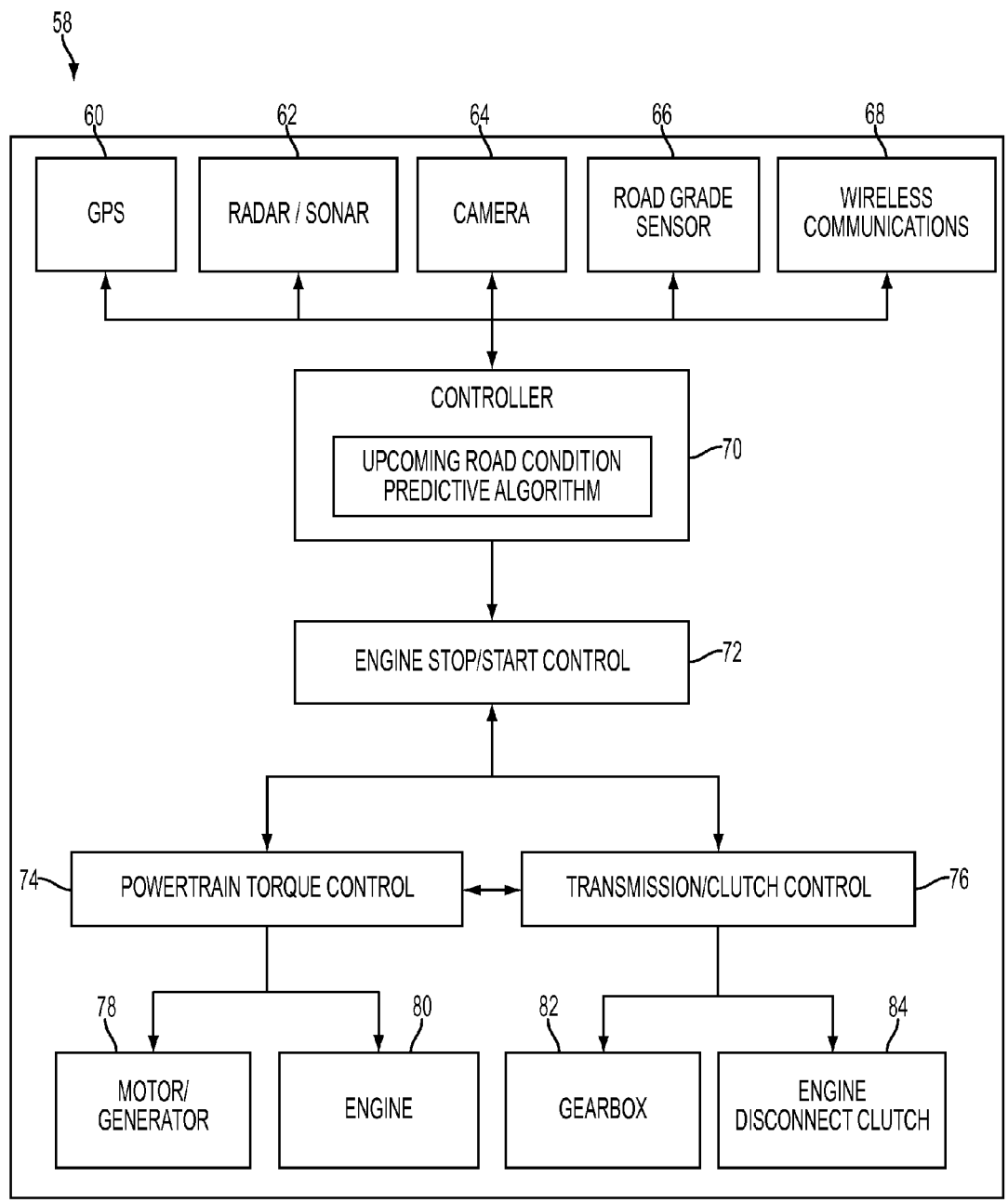
FIG. 2 illustrates a vehicle having a predictive engine pull up and pull down control.

Referring now to FIG. 2, an HEV 58 is shown in schematic form. The HEV 58 may have a similar powertrain arrangement as described above with respect to FIG. 1. The HEV 58 comprises various sensors including a global positioning system (GPS) 60, a radar or sonar system 62, an optical camera 64, a road grade sensor 66, and wireless communications system 68. The wireless communications system 68 may include WiFi, cellular data, Bluetooth, or other wireless communications devices. As indicated by the arrows, the sensors 60-68 are in communication with a controller 70. The controller 70, which may be a VSC or other controller, includes a predictive algorithm configured to forecast upcoming road conditions. The predicted road conditions may be indicative of whether an EPUD request is necessary or appropriate. The controller 70 communicates with an Engine Stop/Start control 72, as indicated by the arrow. The Engine Stop/Start control 72 is in communication with a powertrain torque control 74 and a transmission clutch control 76, which are also in communication with each other. The powertrain torque control 74 controls a motor/generator 78 and an engine 80. The transmission/clutch control 76 controls a gearbox 82 and an engine disconnect clutch 84.

Figure 3:
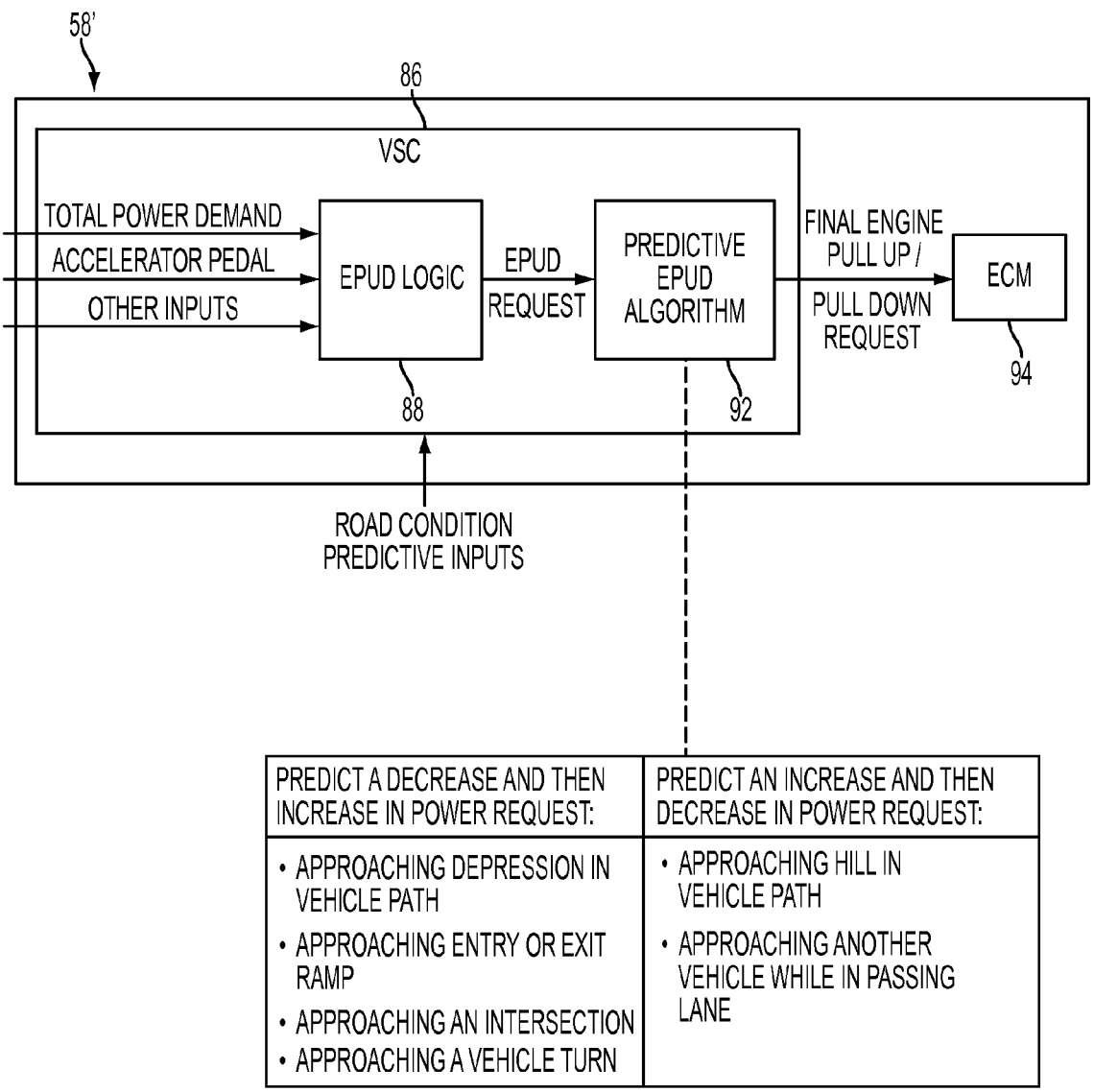
FIG. 3 illustrates a controller having predictive engine pull up and pull down functions.

Referring now to FIG. 3, an embodiment of an HEV 58' is shown in schematic form. HEV 58' includes a VSC 86. The VSC 86 includes an EPUD logic module 88. The EPUD logic module 88 issues EPUD requests according to the base EPUD logic in response to a total drive power command, an accelerator pedal position and variance, and other inputs. The VSC 86 also receives road condition predictive inputs from other sensors or controllers. These sensors may include GPS, radar/sonar systems, optical cameras, road grade sensors, or wireless communications systems. The VSC 86 includes a predictive EPUD algorithm 92. The predictive EPUD algorithm 92 may modify the EPUD request in response to the road condition predictive inputs, as illustrated in the table indicated by the dashed line. The predictive EPUD algorithm 92 is configured to predict a decrease and subsequent increase in driver power request in response to inputs indicating that the vehicle is approaching a depression in the vehicle path, approaching a highway entry or exit ramp, approaching an intersection, approaching a vehicle turn, or other appropriate scenarios. Similarly, the predictive EPUD algorithm 92 is configured to predict an increase and subsequent decrease in driver power request in response to inputs indicating that the vehicle is approaching a hill in the vehicle path, in a passing lane approaching another vehicle, or other appropriate scenarios. The predictive EPUD algorithm 92 outputs a final engine pull up or pull down request to an engine control module (ECM) 94. The ECM 94 may stop or start the engine in response to the request.

Figure 4:
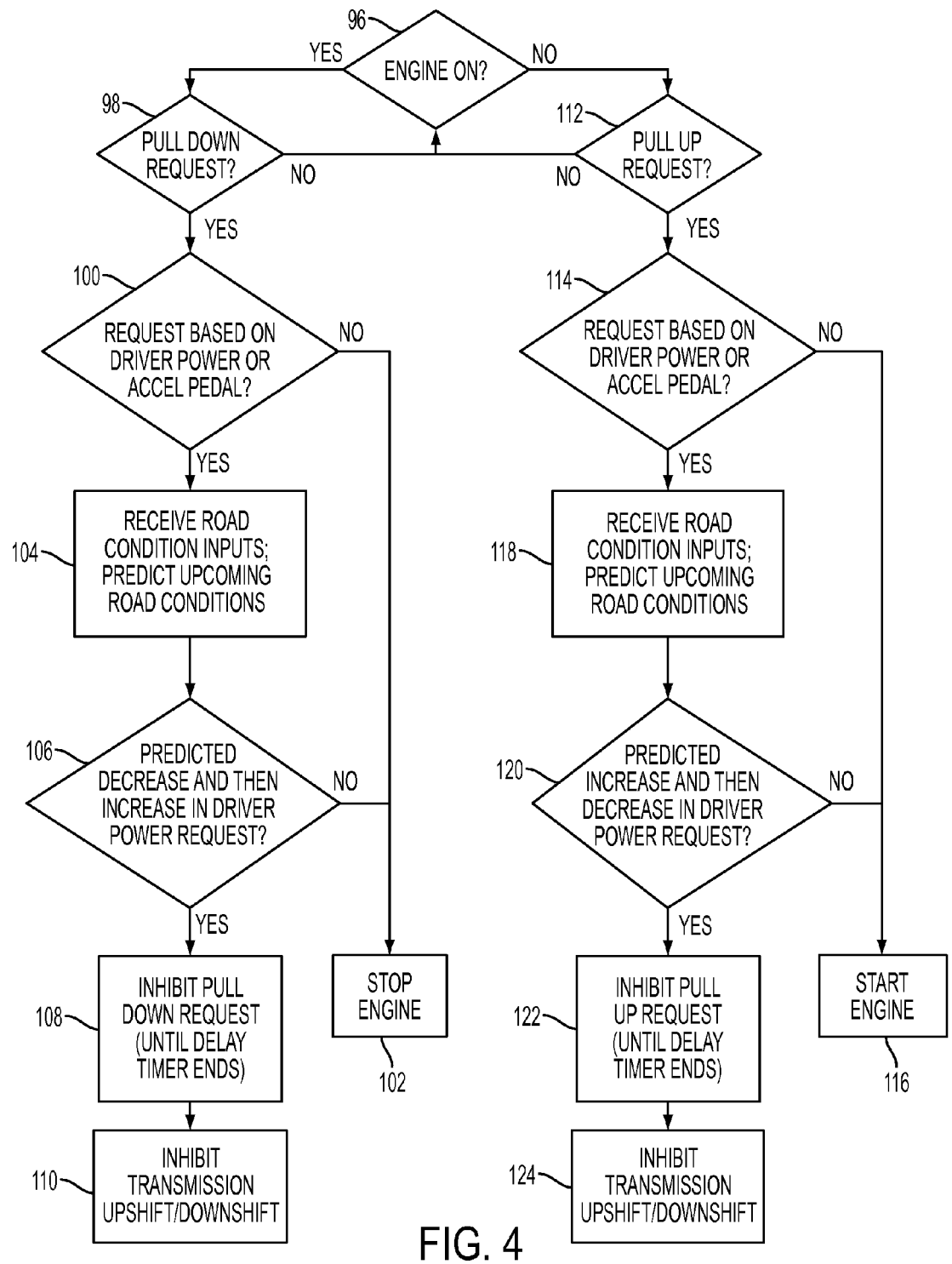
FIG. 4 is a flowchart illustrating a method of controlling an engine in a hybrid vehicle.

Referring now to FIG. 4, an embodiment of a predictive EPUD algorithm is illustrated. The algorithm begins at operation 96, at which a determination is made of whether the engine is on. If yes, then a determination is made of whether a pull down request has been issued, as illustrated at operation 98. If no, then control returns to operation 96. If yes, then a determination is made of whether the pull down request is based on a change in driver power request or accelerator pedal position, as illustrated at operation 100. If no, then the engine is stopped, as illustrated at block 102. Returning to operation 100, if a determination is made that the pull down request is based on a change in driver power request or pedal position, then a prediction of upcoming road conditions is made based on road condition inputs, as illustrated at block 104. A determination is then made based on the predicted road conditions of whether a decrease and subsequent increase in driver power request is anticipated, as illustrated at operation 106. This determination may be performed generally as described above with respect to FIG. 3. If no, then the engine is stopped, as illustrated at block 102. If yes, then the engine pull down request is inhibited, as illustrated at block 108. The inhibition of the pull down request is limited by a delay timer. In this fashion, the control logic avoids unnecessary engine run time if the decrease in driver power request continues. A transmission downshift or upshift may also be inhibited, as illustrated at block 110.

Returning to operation 96, if a determination is made that the engine is not on, then a determination is made of whether a pull up request has been issued, as illustrated at operation 112. If no, then control returns to operation 96. If yes, then a determination is made of whether the pull up request is based on a change in driver power request or accelerator pedal position, as illustrated at operation 114. If no, then the engine is started, as illustrated at block 116. Returning to operation 114, if a determination is made that the pull up request is based on a change in driver power request or pedal position, then a prediction of upcoming road conditions is made based on road condition inputs, as illustrated at block 118. A determination is then made based on the predicted road conditions of whether an increase and subsequent decrease in driver power request is anticipated, as illustrated at operation 120. This determination may be performed generally as described above with respect to FIG. 3. If no, then the engine is started, as illustrated at block 116. If yes, then the engine pull up request is inhibited, as illustrated at block 122. The inhibition of the pull up request is limited by a delay timer. In this fashion, the control logic avoids exceeding battery discharge limits if the increase in driver power request continues. A transmission upshift or downshift may also be inhibited, as illustrated at block 124.

Figure 5A:
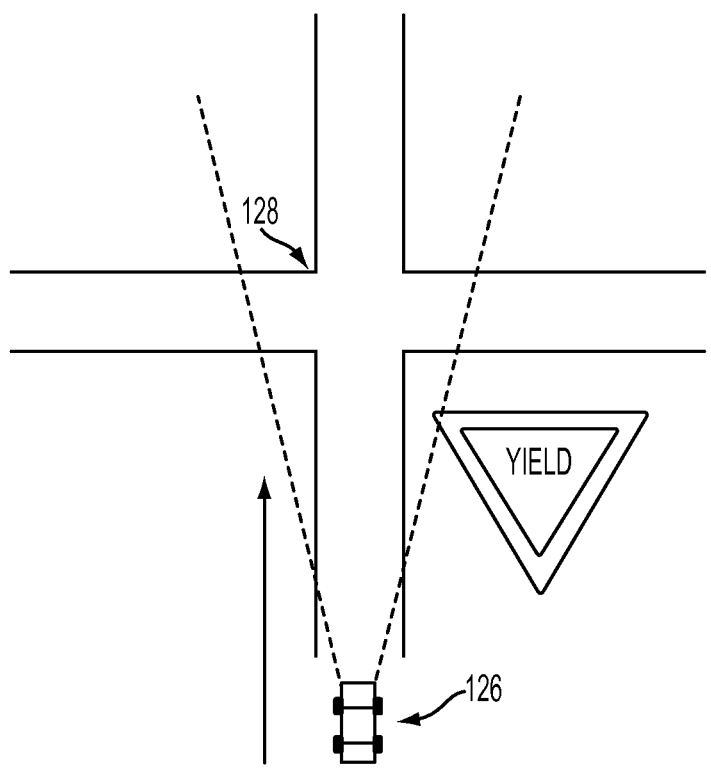
FIGS. 5a and 5b illustrate examples of operation of a predictive engine pull up and pull down system.

Referring now to FIG. 5a, an example of operation of a method according to the present disclosure is illustrated. A vehicle 126 is equipped with a predictive EPUD system generally as described above and with an array of sensors having a detection field of view illustrated by the dashed lines. The vehicle 126 approaches an intersection 128, which is controlled by a Yield sign, with the engine running. Generally, a driver approaching a yield sign will release the accelerator pedal while looking for traffic, and subsequently depress the accelerator pedal when traffic is clear. In response to the release of the accelerator pedal, the base EPUD logic may issue an engine pull down request. Sensors in the vehicle detect that the vehicle is approaching the intersection 128. As an example, a camera may optically recognize the Yield sign.

As another example, a navigation system with mapping data may detect the vehicle's approach to the intersection 128. Various other sensors may similarly detect the approach to the intersection 128. In response to these inputs, the predictive EPUD system may predict a decrease and subsequent increase in driver power request and inhibit the pull down request. If substantial cross-traffic through the intersection 128 is detected by radar, sonar, optical detection, or other means, then the predictive EPUD system may not predict a subsequent increase in driver power request, and the engine will be shut down.

Figure 5B:
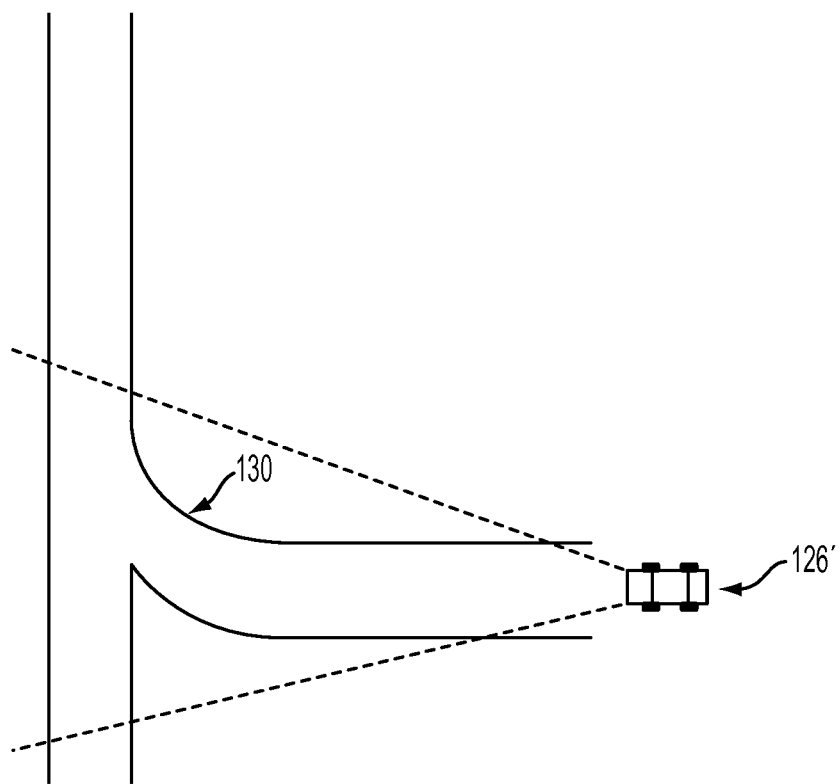

Referring now to FIG. 5b, another example of operation of a method according to the present disclosure is illustrated. A vehicle 126' is equipped with a predictive EPUD system generally as described above and with an array of sensors having a detection field of view illustrated by the dashed lines. The vehicle 126' approaches a highway on-ramp 130. Generally, a driver approaching an on-ramp will release the accelerator pedal to decrease the power demand while on an on-ramp and subsequently depress the accelerator pedal to increase the power demand when merging onto the highway. In response to the release of the accelerator pedal, the base EPUD logic may issue an engine pull down request. Sensors in the vehicle detect that the vehicle is approaching the on-ramp 130. As an example, a navigation system with mapping data may detect the vehicle's approach to the on-ramp 130. Various other sensors may similarly detect the approach to on-ramp 130. In response to these inputs, the predictive EPUD system may predict a decrease and subsequent increase in driver power request and inhibit the pull down request.

While the disclosed method is described in conjunction with a hybrid vehicle having a modular powertrain, a similar method may of course be implemented in vehicles having other hybrid powertrain configurations, such as a parallel hybrid powertrain.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a hybrid vehicle having an engine configured to automatically stop in response to an engine stop request and automatically start in response to an engine start request, the method comprising:
   selectively inhibiting an engine stop request based on an anticipated duration of an expected decreased driver power command state to reduce occurrence of successive automatic stops and automatic starts; and
   delaying a vehicle transmission downshift or upshift in response to the anticipated duration of the expected decreased driver power command state.

2. The method of claim 1, wherein the anticipated duration of the expected decreased driver power command state is based on whether the vehicle is approaching a depression in a vehicle path.

3. The method of claim 1, wherein the anticipated duration of the expected decreased driver power command state is based on whether the vehicle is approaching a highway entry or exit ramp.

4. The method of claim 1, wherein the anticipated duration of the expected decreased driver power command state is based on whether the vehicle is approaching an intersection.

5. The method of claim 1, wherein the anticipated duration of the expected decreased driver power command state is based on whether the vehicle is turning.

6. The method of claim 1, wherein the anticipated duration of the expected decreased driver power command state is based on a signal from a navigation system, optical camera, radar, sonar, wireless data communication system, or a steering input sensor.

7. A method for controlling a vehicle having an engine with auto stop and auto start functions, the method comprising:
   inhibiting the engine auto start function in response to an anticipated increase and subsequent decrease in driver power command, wherein the anticipated increase and subsequent decrease in driver request is based on whether the vehicle is approaching a hill.

8. The method of claim 7, wherein the anticipated increase and subsequent decrease in driver request is based on whether the vehicle is located in a passing lane and approaching a second vehicle.

9. The method of claim 7, wherein the anticipated increase and subsequent decrease in driver power command is based on a signal from a navigation system, optical camera, radar, sonar, wireless data communication system, or steering input sensors.

10. A hybrid electric vehicle comprising:
    an engine configured to stop in response to a pull down request and start in response to a pull up request; and
    a controller configured to inhibit a pull down request, issued based on a decrease in driver power request, in response to an anticipated subsequent increase in driver power command, inhibit an engine pull up request, issued based on an increase in driver power request, in response to an anticipated subsequent decrease in driver power command, and delay a vehicle transmission downshift or upshift in response to the anticipated subsequent increase in driver power command.

11. The hybrid electric vehicle of claim 10, wherein the controller is further configured to inhibit the pull down request in response to a detected vehicle approach to a depression in a vehicle path.

12. The hybrid electric vehicle of claim 10, wherein the controller is further configured to inhibit the pull down request in response to a detected vehicle approach to a highway entry or exit ramp.

13. The hybrid electric vehicle of claim 10, wherein the controller is further configured to inhibit the pull down request in response to a detected vehicle approach to an intersection.

14. The hybrid electric vehicle of claim 10, wherein the controller is further configured to inhibit the pull down request in response to an anticipated vehicle turn.

15. The hybrid electric vehicle of claim 10, wherein the controller is further configured to inhibit the pull up request in response to a detected vehicle approach to a hill.

16. The hybrid electric vehicle of claim 10, wherein the controller is further configured to inhibit the pull up request in response to a detected vehicle location in a passing lane and approach to a second vehicle.

* * * * *